(12) United States Patent
Banerjee (10) Patent No.: US 11,928,690 B2
(45) Date of Patent: Mar. 12, 2024

(54) METHOD AND SYSTEM FOR UPGRADE IN PROCESSING REQUESTS

(71) Applicant: Visa International Service Association, San Francisco, CA (US)

(72) Inventor: Arnab Banerjee, Leander, TX (US)

(73) Assignee: Visa International Service Association, San Francisco, CA (US)

( * ) Notice: Subject to any disclaimer, the term of this patent is extended or adjusted under 35 U.S.C. 154(b) by 163 days.

(21) Appl. No.: 17/483,064

(22) Filed: Sep. 23, 2021

(65) Prior Publication Data

US 2023/0088260 A1 Mar. 23, 2023

(51) Int. Cl.
*G06Q 20/42* (2012.01)
*G06N 20/00* (2019.01)

(52) U.S. Cl.
CPC .......... *G06Q 20/425* (2013.01); *G06N 20/00* (2019.01)

(58) Field of Classification Search
None
See application file for complete search history.

(56) References Cited

U.S. PATENT DOCUMENTS

| 10,915,900 B1* | 2/2021 | Higgins | G06N 20/00 |
| 10,937,014 B2 | 2/2021 | Jayachandran | |
| 2016/0140559 A1* | 5/2016 | Jordan | G06Q 20/405 |
| | | | 705/44 |
| 2020/0380490 A1* | 12/2020 | Jayachandran | G07G 1/0009 |
| 2021/0295295 A1* | 9/2021 | Sukhija | G06Q 20/405 |
| 2022/0051249 A1* | 2/2022 | Vijayaraghavan | G06Q 20/027 |

FOREIGN PATENT DOCUMENTS

| AU | 2019204417 A1 * | 1/2020 | G06Q 20/12 |
| WO | WO-2019074689 A1 * | 4/2019 | G06Q 20/00 |

* cited by examiner

*Primary Examiner* — Paul S Schwarzenberg
(74) *Attorney, Agent, or Firm* — Kilpatrick Townsend & Stockton LLP (57) ABSTRACT

Embodiments provide methods and systems for upgrading an authorization request message in a dual message system format to an upgraded authorization request message in a single message system format without requiring any modifications to existing systems of acquirers and issuers. A transaction processing network computer may upgrade an authorization request message based on a score assigned to the transaction using a machine learning algorithm. The score indicates a likelihood that a final value of the transaction when finalized is same as an initial value of the transaction. If the score is above predetermined threshold, the transaction processing network computer upgrades the authorization request message to a single message system format.

13 Claims, 4 Drawing Sheets

METHOD AND SYSTEM FOR UPGRADE IN PROCESSING REQUESTS

CROSS-REFERENCES TO RELATED APPLICATIONS

None.

BACKGROUND

Existing transaction processing systems include a dual message system and a single message system. Entities in a dual message system environment request/provide authorization for a transaction in a first set of messages, and then settle the same transaction in a second set of messages. On the other hand, entities in a single message system environment are configured to authorize and settle a transaction in a single set of messages. The single message system is more widely implemented among the issuers than among the resource providers or acquirers. The switch from the older dual message system to newer single message system requires investment and technical improvement to existing systems of the resource providers and/or the acquirers. Most resource providers and/or acquirers are reluctant to upgrade their existing systems.

The dual message system requires generation and processing of extraneous messages that could be eliminated. Thus, computers executing in the dual message system allocate processing power for processing the second set of messages that could be eliminated. In addition, since these messages include sensitive information (e.g. account data), unnecessary generation and transmission of these type of messages increase the risk of a data breach.

Embodiments address these and other problems individually and collectively.

BRIEF SUMMARY

Embodiments provide methods and systems for upgrading an authorization request message in a dual message system format to an upgraded authorization request message in a single message system format without requiring any modifications to existing systems of acquirers and issuers.

A method is disclosed. The method comprises receiving, by a server computer from a transport computer, an authorization request message associated with a transaction between an account holder and a resource provider, wherein the authorization request message requires a second message in addition to the authorization request message to finalize the transaction upon authorization; assigning, by the server computer, a score to the transaction; comparing, by the server computer, the score to a predetermined threshold; and upgrading, by the server computer, the authorization request message into an upgraded authorization request message that is configured for authorizing and finalizing the transaction at the same time prior to receiving the second message from the transport computer.

Another embodiment is directed to a server computer configured or programmed to receive, from a transport computer, an authorization request message associated with a transaction between an account holder and a resource provider, wherein the authorization request message requires a second message in addition to the authorization request message to finalize the transaction upon authorization; assign a score to the transaction; compare the score to a predetermined threshold; and upgrade the authorization request message into an upgraded authorization request message that is configured for authorizing and finalizing the transaction at the same time prior to receiving the second message from the transport computer.

Further details regarding embodiments can be found in the Detailed Description and the Figures.

DETAILED DESCRIPTION

Prior to discussing embodiments, some terms can be described in further detail.

A "user" may include an individual or a computational device. In some embodiments, a user may be associated with one or more personal accounts, user devices and/or mobile devices. In some embodiments, the user may be a cardholder, account holder, or consumer.

A "resource provider" may be an entity that can provide a resource such as goods, services, information, and/or access. Examples of resource providers includes merchants, data providers, transit agencies, governmental entities, venue and dwelling operators, etc.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

A "transaction processing network" may include a network for processing transaction (e.g. a payment transaction). A transaction processing network may include data processing subsystems, networks, server computers and operations used to support and deliver authorization services, exception file services, and clearing and settlement services. The transaction processing network may be any suitable network able to transmit and receive financial system transaction messages (e.g., ISO 8583 messages), and process transactions. An exemplary transaction processing system may include VisaNet™. Payment processing systems such as VisaNet™ are able to process credit card transactions, debit card transactions, and other types of commercial transactions.

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the consumer.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g., POS equipment) that indicates approval of the transaction. The code may serve as proof of authorization. As noted above, in some embodiments, a payment processing network may generate or forward the authorization response message to the merchant.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

Figure 1:
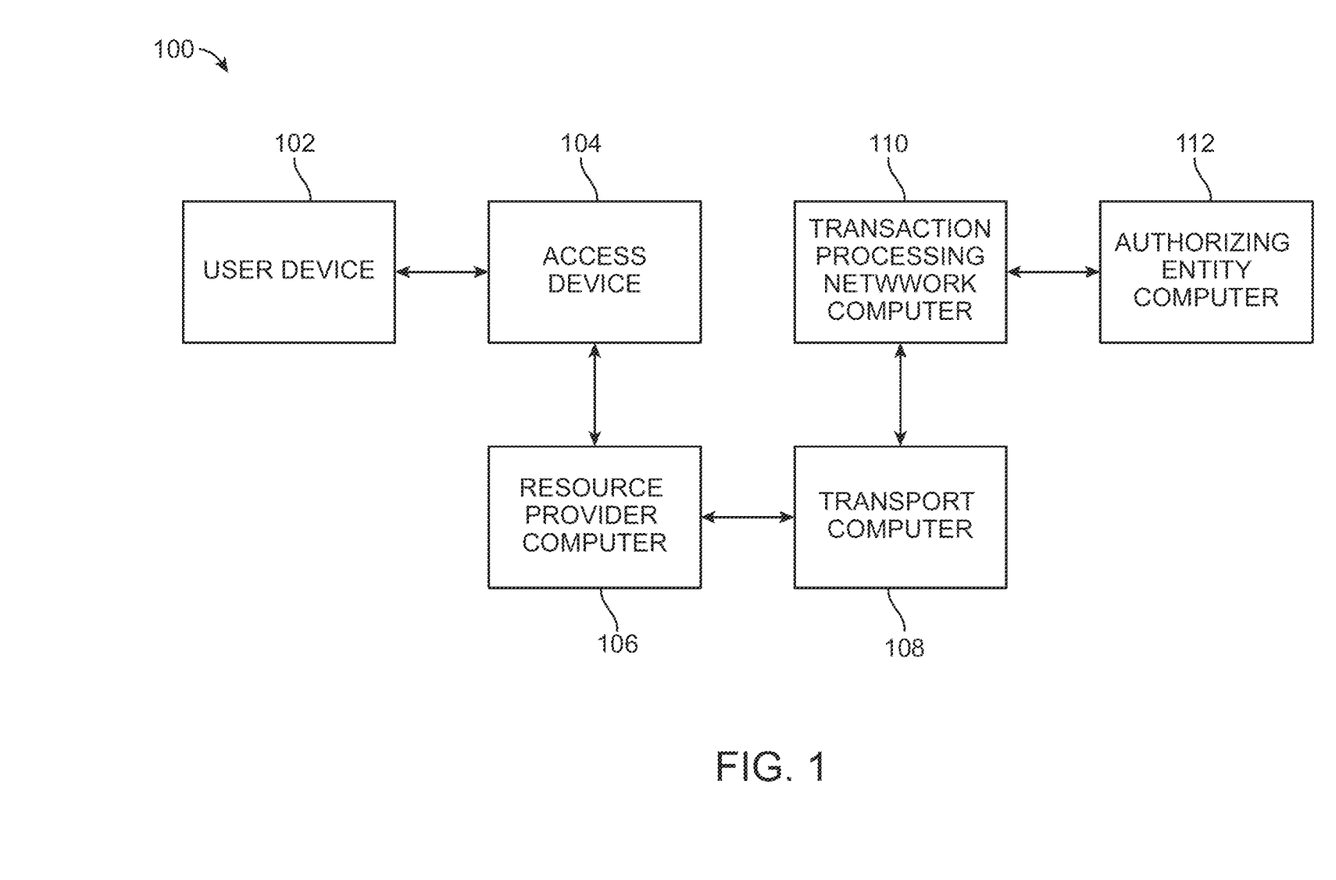
FIG. 1 shows a block diagram of a system for processing a transaction according to embodiments.

FIG. 1 shows a system 100 according to various embodiments. The system 100 comprises a user device 102, an access device 104, a resource provider computer 106, a transport computer 108, a transaction processing network computer 110, and an authorizing entity computer 112. The user device 102 can be in operative communication with the access device 104. The access device 104 can be in operative communication with the resource provider computer 106, which may be in operative communication with the transport computer 108. The transport computer 108 can be in operative communication with the transaction processing network computer 110. The transaction processing network computer 110 can be in operative communication with the authorizing entity computer 112.

For simplicity of illustration, a certain number of components are shown in FIG. 1. It is understood, however, that embodiments may include more than one of each component. In addition, some embodiments may include fewer than or greater than all of the components shown in FIG. 1.

Messages between at least the devices in FIG. 1 can be transmitted using a secure communications protocols such as, but not limited to, File Transfer Protocol (FTP); HyperText Transfer Protocol (HTTP); Secure Hypertext Transfer Protocol (HTTPS), SSL, ISO (e.g., ISO 8583) and/or the like. The communications network may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

The user device 102 can include any suitable device operable by a user. The user device 102 can be a smart phone, a smart watch, a tablet, a laptop computer, a desktop computer, etc. The user device 102 may be able to receive communications from and send communications to the access device 104.

The access device 104 can include a device that provides access to a remote system. The access device 104 may be able to communicate with the user device 102 and the resource provider computer 106. The access device 104 may generally be located in any suitable location, such as at the location of the resource provider computer 106. The access device can be a POS terminal, a cellular phone, a PDA, a personal computer, a tablet, a hand-held specialized reader, a set-top box, an electronic cash register, a vending machine, an automated teller machine, a virtual cash register, a kiosk, a security system, an access system, etc.

The resource provider computer 106 can include a computer associated with a resource provider (e.g. a merchant). The resource provider computer 106 can receive information (e.g., transaction data) from the access device 104 regarding a transaction during the transaction with the user device 102. The transaction may be conducted using an account of the user issued by an authorizing entity. The resource provider computer 106 can provide the transaction data to the transport computer 108. In some embodiments, the resource provider computer 106 can be integrated into a single device with the access device 104.

The resource provider computer 106 or the access device 104 can generate an authorization request message, which can be provided to the transport computer 108 during the transaction for authorization of the transaction.

The transport computer 108 may be any computer for receiving and forwarding authorization messages according to embodiments. In one embodiment, the transport computer 108 may be a computer of an acquiring entity that enables a resource provider to conduct specific types of transactions. The transport computer 108 may receive the authorization request message from the resource provider computer 106 and may forward the message to the transaction processing network computer 110. According to various embodiments, the transport computer 108 may transmit the authorization request message to the transaction processing network computer 110 in a first format (e.g. dual message format) compatible with a dual message system where transactions are authorized and settled using two separate sets of messages.

The transaction processing network computer 110 may be any computer or server computer for processing transactions according to embodiments. For example, the transaction processing network computer 110 may be a payment processing network computer. An exemplary payment processing network may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

The transaction processing network computer 110 may analyze the authorization request message to determine that the message is in the first format (e.g. a standard ISO 8583 dual message authorization request format) and may determine whether the message may be upgraded to a second format (e.g. a single message format for authorization request and settlement) compatible with a single message system where transactions are authorized and settled using a single set of messages. The transaction processing network computer 110 may upgrade the authorization request message into an upgraded authorization request message that is in the second format.

The transaction processing network computer 110 may determine, based on the data in the authorization request message, an authorizing entity computer 112 associated with the authorizing entity that issued the user account used in the transaction. For example, the transaction processing network computer 110 may analyze an account identifier of the user account provided in the authorization request message and may determine that the first six digits of the account identifier comprises an issuer identification number (IIN) specifying an authorizing system associated with the account represented by the account identifier. In one embodiment, the authorizing entity computer 112 may be a computer of an issuing entity that issues credentials and/or an account holder card to the user such as a bank, government agency, security network, etc. Upon determination of the authorizing entity computer, the transaction processing network computer 110 may determine an address of the authorizing entity computer 112, so that the upgraded authorization request message can be routed to the authorizing entity computer 112 for authorization and settlement of the transaction.

The authorizing entity computer 112 may be any computer or server computer for processing transactions and determining whether or not to authorize an transaction according to embodiments. The authorizing entity computer 112 can be operated and/or maintained by an authorizing entity. The authorizing entity computer 112 can determine whether or not to authorize a transaction when receiving the upgraded authorization request message. For example, the authorizing entity computer 112 can determine an authorization result based on the data contained in the upgraded authorization request message. For example, the data may comprise an account identifier or PAN that is associated with an availability of funds or credit that may be compared to a transaction value (e.g., a transaction amount). The authorizing entity computer 112 may evaluate the received data and determine an authorization result of "approve" or "decline." The authorizing entity computer 112 may generate an authorization response message that includes the authorization result of "approve" or "decline." Since the upgraded message is in the second format, the authorization response message further includes additional data (e.g. settlement data) that is required to finalize the transaction.

Before further describing specific systems and methods for performing efficient transaction processing using the upgraded authorization request message within the system 100, a brief description of how transaction processing may proceed in transaction infrastructure, according to some embodiments, will be provided for context.

The user may conduct a transaction at a resource provider location using the user device 102. The transaction may be a payment transaction (e.g., for the purchase of a good or service), an access transaction (e.g., for access to a transit system), or any other suitable transaction. The user device 102 can interact with the access device 104 at a resource provider associated with resource provider computer 106. For example, the user may tap the user device 102 against an NFC reader of the access device 104, or otherwise bring the user device 102 into a near field communication range with the access device 104, to perform a contactless transaction. Alternatively, the user may swipe or dip the user device 102 in the access device 104 to perform a contact transaction.

In order to authorize the transaction, an authorization request message in a first format (e.g. dual message system format) may be generated by the access device 104 or the resource provider computer 106 and then forwarded to the transport (e.g., acquirer) computer 108. After receiving the authorization request message, the authorization request message is then sent to the transaction processing network computer 110. The transaction processing network computer 110 then determines that the authorization request message can be upgraded to a different format (e.g. a single message system (SMS) format) for faster and efficient processing of the transaction that eliminates additional messages between the transaction processing network computer 110 and the authorizing entity computer 112. The transaction processing network computer 110 generates the upgraded authorization request message (e.g. a full financial message) and forwards the upgraded authorization request message to the corresponding authorizing entity computer 112 associated with an authorizing entity associated with a user account of the user of the user device 102. According to various embodiments, a message in the SMS format is configured to authorize and settle a transaction at the same time (e.g. using the same single message). Generally, after a transaction has been authorized and as part of the settlement process, funds are transferred from an issuer of the account used in the transaction to a resource provider's account at the acquirer.

After the authorizing entity computer 112 receives the upgraded authorization request message, the authorizing entity computer 112 sends an authorization response message back to the transaction processing network computer 110 to indicate whether the current interaction is authorized (or not authorized), as well as additional information for finalizing (e.g. settling) the transaction. The transaction processing network computer 110 then stores the additional information received from the authorizing entity computer 112 as well as additional transaction data at a database. The transaction processing network computer 110 sends an authorization response message back to the transport computer 108. In some embodiments, the transaction processing network computer 110 may decline the interaction even if the authorizing entity computer 112 has authorized the interaction, for example depending on a value of a fraud risk score. The transport computer 108 then sends the response message back to the resource provider computer 106.

After the resource provider computer 106 receives the authorization response message, the resource provider computer 106 may then provide the authorization response message to the user. For example, the response message may be displayed by the access device 104, or may be printed out on a physical receipt. The receipts may include transaction data for the transaction.

The upgrade of the initial authorization request message of the transport computer 108 may be unbeknownst to the transport computer. That is, the transport computer may be entirely unaware that the transaction processing network computer upgraded the authorization request message to a single message system and that the transaction is already finalized (e.g. settled). Accordingly, since the transport computer 108 functions on the first message format (e.g. the dual message system), the transport computer 108 may send a second message (e.g. a clearing and settlement message) to the transaction processing network computer 110 to finalize the transaction after the transaction has been authorized by the authorizing entity (that, unbeknownst to the transport computer, has already settled the transaction with the transaction processing network computer). Upon receiving the second message from the transport computer, the transaction processing network computer 110 may retrieve the data (e.g. the settlement data received from the authorizing entity computer) associated with the transaction from the database, confirm that the transaction is finalized (e.g. settled), and notify the transport computer 108.

Figure 2:
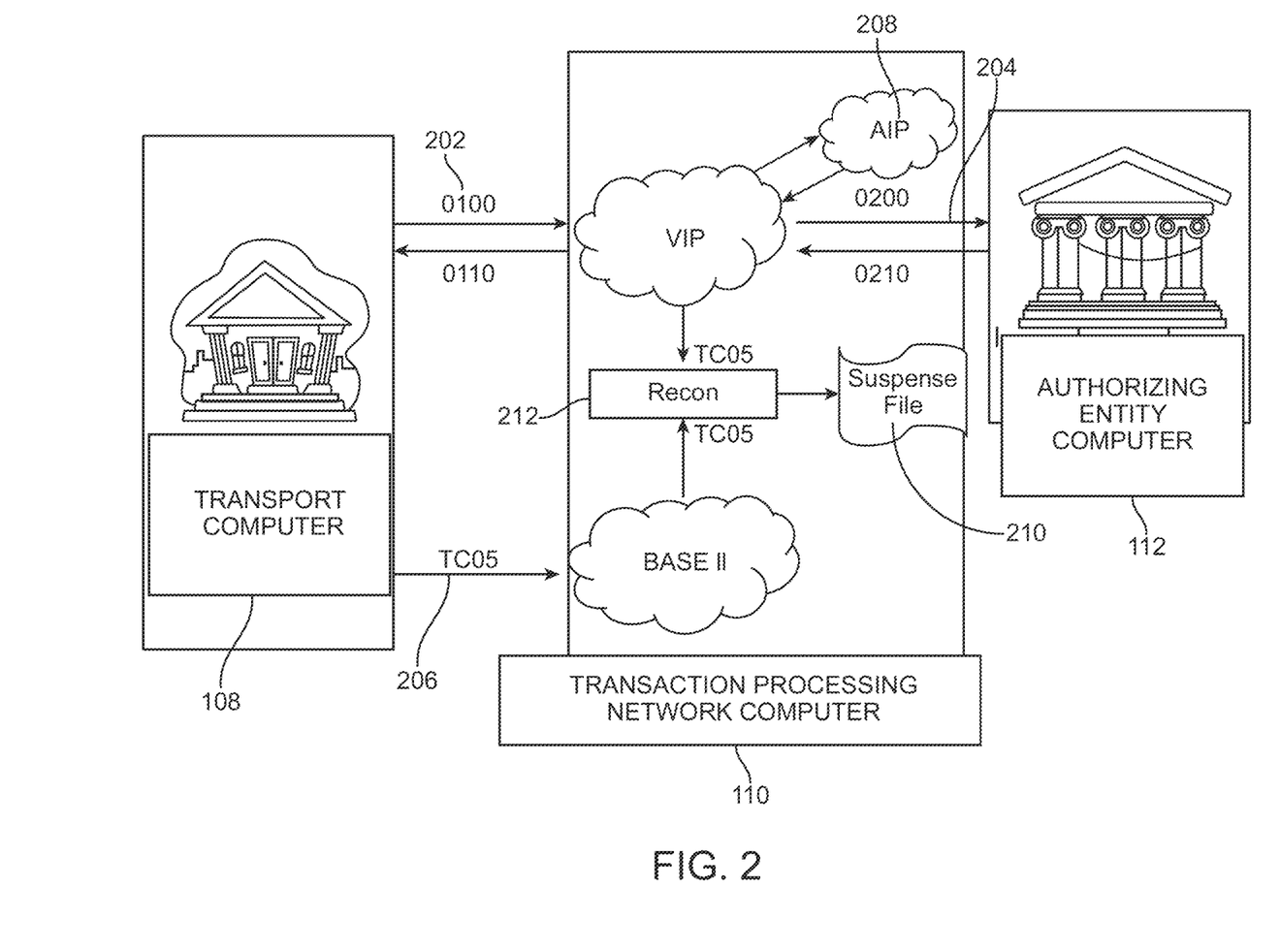
FIG. 2 shows a block diagram for a transaction processing network computer upgrading a transaction authorization request message according to various embodiments.

FIG. 2 shows a block diagram for a transaction processing network computer upgrading a transaction authorization request message according to various embodiments. As illustrated in FIG. 2, the communication between the transaction processing network computer 110 and the transport computer 108 may be based on a first format (e.g. dual message system for processing a transaction), while the communication between the transaction processing network computer 110 and the authorizing entity computer 112 may be based on a second format (e.g. a single message system for processing a transaction). According to various embodiments, the first format may refer to authorizing and finalizing a transaction in two separate steps that require multiple messages to be exchanged between the parties. The second format may refer to authorizing and finalizing a transaction in a single step that require a single set of messages to be exchanged between a pair of entities in the transaction processing system. Since the second format requires less messages to be generated and exchanged, it improves the processing speed of each computer by reserving the processing power dedicated to extraneous messages, it also reduces the risk of the sensitive information included in the messages to be obtained by unintended third parties by simply eliminating the amount of messages, it provides a technical ability to perform authorization and finalizing functions in a single message.

Referring back to FIG. 2, when the transaction processing network computer 110 receives from the transport computer 108 an authorization request message 202 in the first format, the transaction processing network computer 110 transmits a scoring request to an AI-based scoring processor 208. The authorization request message is associated with a transaction between an account holder and a resource provider. The authorization request message may include transaction related data such as information about the resource provider, information about the transaction (e.g. a transaction value (e.g. a transaction amount)) and an account identifier of the account holder. For example, if the transaction is a payment transaction, the transaction value may include the amount of the transaction. If the transaction is a request to access a location, the transaction value may include details of the access privilege (e.g. day or time of access, specific locations that will be accessed, etc.).

According to some embodiments, the AI-based scoring processor 208 may be a part of the transaction processing network computer 110, or may be managed by the same transaction processing network associated with the transaction processing network computer 110. Upon receiving the request from the transaction processing network computer 110, the AI-based scoring processor 208 may analyze the transaction related data. The AI-based scoring processor 208 may then assign a score to the transaction based on the transaction related data as well as additional information available to the AI-based scoring processor 208. For example, the score may be determined based on one or more of a transaction history of the user, a transaction history of the resource provider, a characteristic of the transaction (e.g. a value of the transaction), a characteristic of the resource provider, etc.

According to various embodiments, the AI-based scoring processor 208 may determine a likelihood that a final value of the transaction (e.g. an authorized and settled value of the transaction) will be the same as an initial value of the transaction. The AI-based scoring processor 208 may then assign the score to the transaction based on the likelihood that the final value will be the same as the initial value. The score may indicate the likelihood that the amount remain consistent through authorization, settlement and clearing of the transaction. For example, a low score may indicate a low amount certainty and a high score may indicate a high amount certainty. In some embodiments, the AI-based scoring processor 208 may determine the likelihood based on past transaction data. The AI-based scoring processor 208 may execute a machine learning algorithm to determine the score for the transaction. The AI-based scoring processor 208 may return the score to the transaction processing network computer 110. In some embodiments, the AI-based scoring processor 208 may determine a score for a transaction for each authorization request message received at the transaction processing network computer 110.

According to an exemplary embodiment, the transaction may be a payment transaction at a merchant. The AI-based scoring processor 208 may determine a likelihood that a final transaction amount when the transaction is finalized (e.g. authorized and then settled) will be the same as the initial transaction amount that is included in the authorization request message. In some embodiments, the AI-based scoring processor 208 may determine the likelihood based on past transaction data. For example, if the merchant is a retail shop, the AI-based scoring processor 208 may determine the final transaction amount is very likely to be the same as the initial transaction amount that is included in the authorization request message based on, for example, the past transaction data of the retail shop. Therefore, the AI-based scoring processor 208 may assign a high score (e.g. an authorization posting score) to the transaction. On the other hand, if the merchant is a restaurant, the AI-based scoring processor 208 may determine the final transaction amount is not very likely to be the same as the initial transaction amount that is included in the authorization request message because the account holder is likely to include a tip based on, for example, the past transaction data of the restaurant. Therefore, the AI-based scoring processor 208 may assign a low score to the transaction. The AI-based scoring processor 208 may determine the score based on a transaction history of the user (e.g. the user often leaves a tip at restaurants or the user never leaves a tip), a transaction history of the merchant (e.g. the restaurant includes tips on their bills and therefore does not accept additional tips, or the restaurant often takes tips thereby changing the final transaction amount), characteristics of the transaction (e.g. the items bought were prepared food items served at a restaurant). This exemplary use case is provided for illustrative purposes and should not be construed as limiting. Embodiments may be used in connection with various types of transactions between transacting entities (e.g. an account holder and a resource provider).

Referring back to FIG. 2, upon receiving the transaction score from the AI-based scoring processor 208, the transaction processing network computer 110 may compare the score to a predetermined threshold. For example, if the scoring is done on a scale of 1 to 10, the threshold may be set somewhere at or above 9. If the score is acceptable (e.g. the score is above the threshold), then the transaction processing network computer 110 may upgrade the authorization request message to an upgraded authorization request message by changing the format from the first format (e.g. the dual message system format) to the second format (e.g. the single message system format). The transaction processing network computer 110 may send the upgraded authorization request message in the second format to the authorizing entity computer 112. The authorizing entity computer 112 may process the authorization request and determine whether the transaction will be authorized or declined. The authorizing entity computer 112 generates an authorization response message in the second format. The authorization response message includes the determination of whether the transaction is authorized, as well as additional data for finalizing the transaction (e.g. any additional data that is required to settle the transaction). The authorizing entity computer 112 may transmit the authorization response message to the transaction processing network computer 110.

According to various embodiments, the authorization request message is formatted for a dual message processing system that requires a second message in addition to the authorization request message to finalize the transaction upon authorization. The transport computer may be configured to operate (e.g. communicate) in the dual message processing system. The upgraded authorization request message is formatted for a single message processing system that authorizes and finalizes the transaction at the same time prior to receiving the second message from the transport computer. The authorizing entity computer may be configured to operate (e.g. communicate) in the single message processing system.

Upon receiving the authorization response message from the authorizing entity computer 112, the transaction processing network computer 110 stores information associated with the upgraded transaction at a database 210. For example, the information may include an indicator that the transaction has been already finalized (e.g. settled) by the authorizing entity computer 112. The transaction processing network computer 110 also generates and sends an authorization response message in the first format to the transport computer 108. The authorization response message in the first format includes the authorization decision of the authorizing entity computer 112.

The upgrading of the authorization request message from the first format to the second format is unbeknownst to the transport computer 108. Since the transport computer 108 communicates in the first format, a certain amount of time after receiving the authorization response message from the transaction processing network computer 110, the transport computer 108 generates and sends a second message 206 (e.g. a clearing and settlement message) in the first format to finalize the transaction. Upon receiving the second message, a reconciliation module 212 of the transaction processing network computer 110 identifies the transaction, retrieves the information associated with the transaction from the database 210, determines that the transaction has been finalized by the authorizing entity computer 112, and informs the transport computer 108 that the transaction has been finalized.

Figure 3:
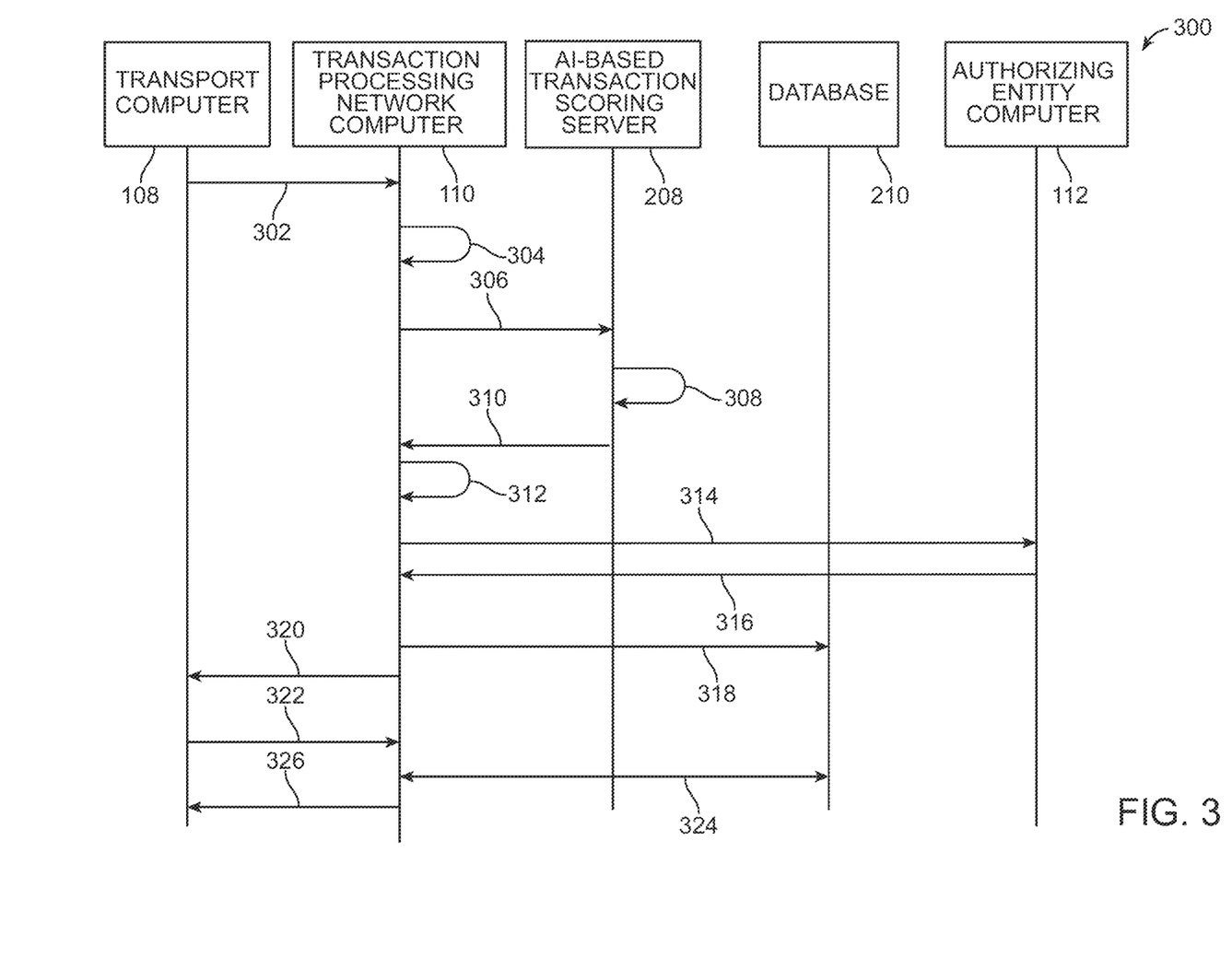
FIG. 3 shows a flow diagram illustrating a method according to various embodiments.

FIG. 3 shows a flow diagram illustrating a method according to various embodiments. Once an account holder conducts a transaction with a resource provider, the resource provider's processing computer will communicate with the transport computer 108 to process the transaction. The transport computer may generate an authorization request message for the transaction and transmit the authorization request message to the transport computer 108.

At step 302, the transport computer 108 will transmit the authorization request message to the transaction processing network computer 110. As explained above, the transport computer 108 may communicate with the transaction processing network computer 110 in a first format that requires a second message (in addition to the authorization request message) to finalize the transaction once the transaction is authorized.

At step 304, the transaction processing network computer 110 may determine that the authorization request message is in the first format and wish to upgrade the authorization request message to an upgraded authorization request message in the second format. A message in the second format may be capable of requesting authorization for, and finalizing (e.g. settling) a transaction at the same time (e.g. using the same single message).

At step 306, the transaction processing network computer 110 may communicate with an AI-based transaction scoring server 208 to request a score to be assigned to the transaction identified in the authorization request message received in step 302.

At step 308, the AI-based transaction scoring server 208 determines a likelihood that a final value of the transaction (when the transaction is finalized) will be same as an initial value of the transaction identified in the authorization request message. The AI-based transaction scoring server 208 assigns a score to the transaction based on the likelihood that the final value will be same as the initial value. According to various embodiments, the AI-based transaction scoring server 208 assigns the score using a machine learning algorithm that takes into account one or more of characteristics of the resource provider, characteristics of the transaction, a transaction history of the account holder, a transaction history of the resource provider, or a characteristic of the transaction, among other data available to the AI-based transaction scoring server 208.

At step 310, the AI-based transaction scoring server 208 may return the score to the transaction processing network computer 110. According to various embodiments, the AI-based transaction scoring server 208 may be a separate processor/server than the transaction processing network computer 110, while both the AI-based transaction scoring server 208 and the transaction processing network computer 110 may be part of the same transaction processing network. In other embodiments, the AI-based transaction scoring server 208 may be provided as part of the transaction processing network computer 110, as discussed below in connection with FIG. 4.

At step 312, the transaction processing network computer 110 may compare the score to a predetermined threshold value. If the threshold value permits (e.g. if the score is higher than the predetermined threshold value), the transaction processing network computer 110 upgrades the authorization request message into an upgraded authorization request message that is configured for authorizing and finalizing the transaction at the same time prior to receiving the second message from the transport computer. For example, upgrading the authorization request message may convert the authorization request message into a full financial message. In some embodiments, the full financial message may be generated by the transaction processing network computer 110 by incorporating attributes from the transaction and/or the authorizing entity (e.g. the issuer) in the full financial message. The resulting full financial message (e.g. the upgraded authorization request message) not only comprises authorization data, but also comprises clearing and settlement information (e.g. a settlement amount, the currency to be used in funds transfer) which can be derived from the authorizing entity configuration information. According to various embodiments, the authorization request message may be formatted for a dual message processing system, and the upgraded authorization request message may be formatted for a single message processing system.

At step 314, the transaction processing network computer 110 may transmit the upgraded authorization request message in the second format to an authorizing entity computer 112. The authorizing entity computer 112 may be configured to work according to a single message processing system. Accordingly, the authorizing entity computer 112 may determine whether the transaction is authorized or declined, and generate an authorization response message including the determination. The authorizing entity computer 112 may also include any necessary data to finalize the transaction in the authorization response message, and transmit the authorization response message in the second format to the transaction processing network computer 110 at step 316.

At step 318, the transaction processing network computer 110 may store at a database 210 information associated with the transaction subject to the upgraded authorization request message along with the data received from the authorizing entity computer 112 to finalize the transaction.

At step 320, the transaction processing network computer 110 transmits an authorization response message in the first format to the transport computer 108. The authorization response message includes a decision of the authorizing entity computer 112 indicating whether the transaction is authorized or declined.

Since the resource provider is unaware of the authorization request message being upgraded, at step 322 the resource provider transmits a second message to the transaction processing network computer 110 to finalize the transaction. However, the transaction has already been finalized with the authorizing entity computer 112 at step 316. The transaction processing network computer 110 confirms this by checking the database 210 for information stored in connection with the transaction. Specifically, upon receiving the second message from the transport computer after the transaction is finalized, at step 324, the transaction processing network computer 110 retrieves the information associated with the transaction from the database, compares the information received in the second message with the information retrieved from the database and determines that the information received in the second message matches with the information retrieved from the database.

According to various embodiments, the transaction may be assigned a transaction identifier by the resource provider, and the transaction identifier may be included in the authorization request message, the upgraded authorization request message, the authorization response message in the second format, the authorization response message in the first format, the second message, and at the database when storing information associated with the transaction. The transaction processing network computer 110 may be able to identify the transaction and retrieve data from the database using the transaction identifier.

At step 326, the transaction processing network computer 110 transmits to the transport computer a message in response to the second message confirming that the transaction is finalized.

Figure 4:
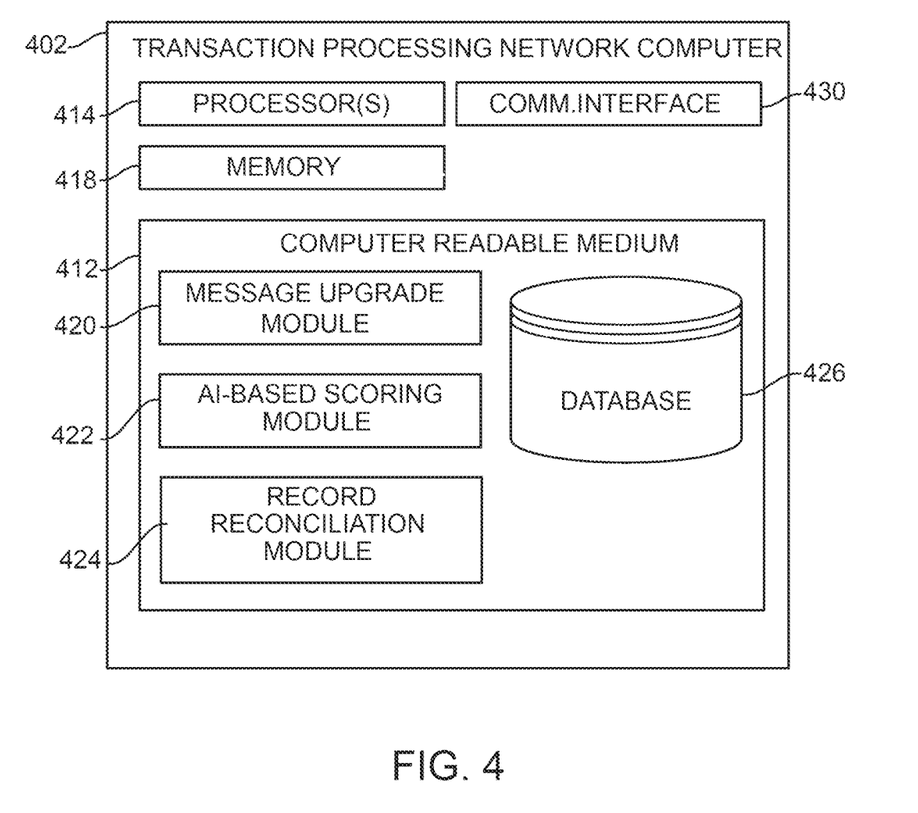
FIG. 4 illustrates a block diagram of a transaction processing network computer according to various embodiments.

FIG. 4 illustrates a block diagram of a transaction processing network computer according to various embodiments. The transaction processing network computer 402 includes one or more processors 414 that may be coupled to a memory 418, a communication interface 430, input/output devices 432, and a computer readable medium 412. The computer readable medium 412 can comprise a message upgrade module 420, an AI-based scoring module 422, a record reconciliation module 424, a database 426, and other suitable modules.

The memory 418 can be used to store data and code. The memory 418 may be coupled to the one or more processor(s) 414 internally or externally (e.g., cloud based data storage), and may comprise any combination of volatile and/or non-volatile memory, such as RAM, DRAM, ROM, flash, or any other suitable memory device.

The communication interface 430 may configured to enable communication between the transaction processing network computer 402 and another electronic device (e.g., transport computer, authorizing entity computer).

According to various embodiments, the computer readable medium 412 may comprise code, executable by the one or more processor(s) 414, for performing a method comprising receiving, from a transport computer, an authorization request message associated with a transaction between an account holder and a resource provider, wherein the authorization request message requires a second message in addition to the authorization request message to finalize the transaction upon authorization; assigning a score to the transaction; comparing the score to a predetermined threshold; upgrading the authorization request message into an upgraded authorization request message that is configured for authorizing and finalizing the transaction at the same time prior to receiving the second message from the transport computer. In some embodiments, the method may also comprise transmitting the upgraded authorization request message to an authorizing entity computer; and receiving an authorization response message in from the authorizing entity computer, wherein the authorizing response message includes an indication about whether the transaction is authorized or declined, and additional information required for finalizing the transaction, wherein the authorization response message finalizes the transaction.

According to various embodiments, the AI-based scoring module 422 may comprise code or software, executable by the one or more processor(s) 414, for assigning the score to the transaction using a machine learning algorithm. For example, the machine learning algorithm may be able to analyze one or more of a transaction history of the account holder, a transaction history of the resource provider, or a characteristic of the transaction. The AI-based scoring module 422, using the machine learning algorithm, may determine a likelihood that a final value of the transaction when finalized is same as an initial value of the transaction; and assign the score to the transaction based on the likelihood that the final value is same as the initial value.

The transaction processing network computer 402 may store, at database 426, information associated with the transaction subject to the upgraded authorization request message. For example, the information may include one or more of the initial value of the transaction, the final value of the transaction, the score assigned to the transaction, the additional information required for finalizing the transaction received from the authorizing entity computer, a transaction identifier associated with the transaction, among other information.

The transaction processing network computer 402 may receive, from the transport computer, the second message after the transaction is finalized, and reconcile the second message with the authorization response message received from the authorizing entity computer using the record reconciliation module 424. According to various embodiments, the record reconciliation module 424 may comprise code or software, executable by the one or more processor(s) 414, for retrieving the information associated with the transaction; comparing information received in the second message with the information retrieved from the database; and determining that the information received in the second message matches with the information retrieved from the database. The transaction processing network computer 402 may then transmit, to the transport computer, a message in response to the second message confirming that the transaction is finalized.

Embodiments provide various advantages. According to various embodiments, an authorization request message in a single message format received at a transaction processing network computer may be upgraded to a dual message format. Since the second format requires less messages to be generated and exchanged, it improves the processing speed of each computer by reserving the processing power dedicated to extraneous messages, it also reduces the risk of the sensitive information included in the messages to be obtained by unintended third parties by simply eliminating the amount of messages, it provides a technical ability to perform authorization and finalizing functions in a single message. In addition, embodiments use an AI-based system to assign a score to the transaction prior to upgrading the authorization request message associated with the transaction. The scoring ensures that the initial amount of the transaction indicated in the authorization request message will be the same as the final (e.g. authorized and settled) amount of the transaction. This way, the transaction processing network does not assume unauthorized funds by upgrading the authorization request message.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

The above description is illustrative and is not restrictive. Many variations will become apparent to those skilled in the art upon review of the disclosure. The scope should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
receiving, by a server computer from a transport computer, an authorization request message associated with a transaction between an account holder and a resource provider;
determining, by the server computer, that the authorization request message is in a first format that requires a second message in addition to the authorization request message to finalize the transaction upon authorization;
transmitting, by the server computer to a machine learning based transaction scoring server, a request to score the transaction;
analyzing, by the machine learning based transaction scoring server using a machine learning algorithm, one or more of a transaction history of the account holder, a transaction history of the resource provider, or a characteristic of the transaction;
determining, by the machine learning based transaction scoring server using the machine learning algorithm, a likelihood that a final value of the transaction when finalized is same as an initial value of the transaction based on the transaction history of the account holder, the transaction history of the resource provider, or the characteristic of the transaction;
assigning, by the machine learning based transaction scoring server using the machine learning algorithm, a score to the transaction based on the likelihood that the final value is same as the initial value;

transmitting, by the machine learning based transaction scoring server, the score to the server computer;

comparing, by the server computer, the score to a predetermined threshold, wherein a score higher than the predetermined threshold indicates that the final value is likely to stay same as the initial value through authorization, settlement and clearing of the transaction;

if the score is higher than the predetermined threshold, upgrading, by the server computer, the authorization request message into second format that is configured for authorizing, settling and clearing the transaction at the same time prior to receiving the second message from the transport computer; and if the score is lower than the predetermined threshold, processing, by the server computer, the authorization request message in the first format where the transaction is first authorized using the authorization request message, then settled using the second message in addition to the authorization request message upon authorization.

2. The method of claim 1, wherein the authorization request message is formatted for a dual message processing system, and the authorization request message in the second format is formatted for a single message processing system.

3. The method of claim 1, further comprising:

transmitting, by the server computer, the authorization request message in the second format to an authorizing entity computer; and receiving, by the server computer, an authorization response message in from the authorizing entity computer, wherein the authorization response message includes an indication about whether the transaction is authorized or declined, and additional information required for finalizing the transaction, wherein the authorization response message finalizes the transaction.

4. The method of claim 3, further comprising:

transmitting, by the server computer, the authorization response message to the transport computer including the indication about whether the transaction is authorized or declined by the authorizing entity computer.

5. The method of claim 3, further comprising:

storing, by the server computer at a database, information associated with the transaction subject to the authorization request message in the second format, wherein the information includes the additional information required for finalizing the transaction received from the authorizing entity computer.

6. The method of claim 5, further comprising:

receiving, by the server computer from the transport computer, the second message after the transaction is finalized;

retrieving, by the server computer from the database, the information associated with the transaction;

comparing information received in the second message with the information retrieved from the database;

determining that the information received in the second message matches with the information retrieved from the database; and transmitting, by the server computer to the transport computer, a message in response to the second message confirming that the transaction is finalized.

7. The method of claim 1, wherein upgrading process is unbeknownst to the resource provider.

8. A server computer comprising:

one or more processors;

a memory storing instructions that, when executed by the one or more processors, cause the one or more processors to:

receive, from a transport computer, an authorization request message associated with a transaction between an account holder and a resource provider;

determine that the authorization request message is in a first format that requires a second message in addition to the authorization request message to finalize the transaction upon authorization;

transmit, to a machine learning based transaction scoring server, a request to score the transaction;

analyze, using a machine learning algorithm, one or more of a transaction history of the account holder, a transaction history of the resource provider, or a characteristic of the transaction;

determine, using the machine learning algorithm, a likelihood that a final value of the transaction when finalized is same as an initial value of the transaction based on the transaction history of the account holder, the transaction history of the resource provider, or the characteristic of the transaction;

assign, using the machine learning algorithm, a score to the transaction based on the likelihood that the final value is same as the initial value;

transmit the score to the server computer;

compare the score to a predetermined threshold, wherein a score higher than the predetermined threshold indicates that the final value is likely to stay same as the initial value through authorization, settlement and clearing of the transaction if the score is higher than the predetermined threshold, upgrade the authorization request message into a second format that is configured for authorizing, settling and clearing the transaction at the same time prior to receiving the second message from the transport computer; and if the score is lower than the predetermined threshold, process the authorization request message in the first format where the transaction is first authorized using the authorization request message, then settled using the second message in addition to the authorization request message upon authorization.

9. The server computer of claim 8, wherein the instructions, when executed by the one or more processors, cause the one or more processors to:

transmit the authorization request message in the second format to an authorizing entity computer associated with an issuer of an account used in the transaction; and receive an authorization response message from the authorizing entity computer, wherein the authorization response message includes an indication about whether the transaction is authorized or declined, and additional information required for finalizing the transaction such that the authorization response message finalizes the transaction, wherein the transport computer is associated with a dual message processing system, and the authorizing entity computer is associated with a single message processing system.

10. The server computer of claim 9, wherein the instructions, when executed by the one or more processors, cause the one or more processors to:

transmit the authorization response message to the transport computer including the indication about whether the transaction is authorized or declined by the authorizing entity computer.

11. The server computer of claim 8, wherein the instructions, when executed by the one or more processors, cause the one or more processors to:

store, at a database, information associated with the transaction subject to the upgraded authorization request message;

receive, from the transport computer, the second message after the transaction is finalized;

retrieve, from the database, the information associated with the transaction;

compare information received in the second message with the information retrieved from the database;

determine that the information received in the second message matches with the information retrieved from the database; and transmit, to the transport computer, a message in response to the second message confirming that the transaction is finalized.

12. The server computer of claim 11, wherein the authorization request message in the first format is formatted for a dual message processing system, the authorization request message in the second format is formatted for a single message processing system, and the message sent to the transport computer is in the dual message processing system such that upgrading process is unbeknownst to the resource provider.

13. The server computer of claim 8, wherein the resource provider is unaware of the authorization request message being upgraded.

* * * * *